Feb. 4, 1936.  F. M. M. B. SALOMON  2,029,796
VIBRATION DAMPENER
Filed Nov. 21, 1934
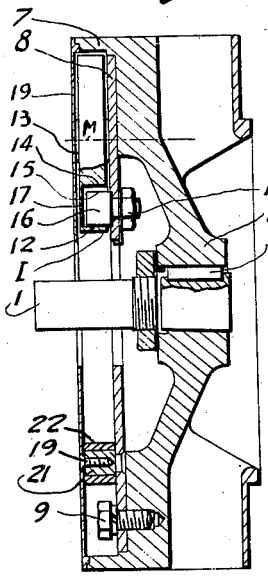
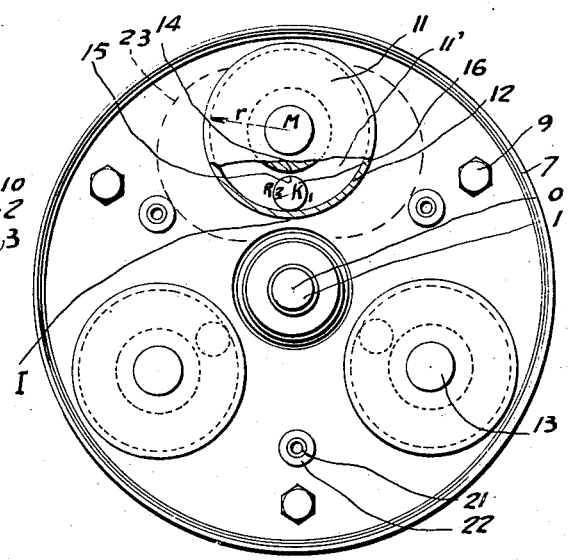
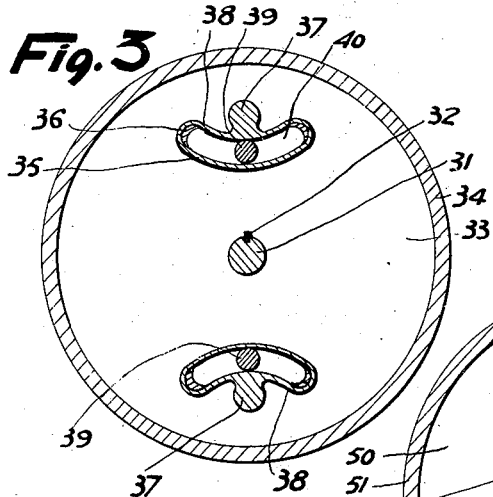
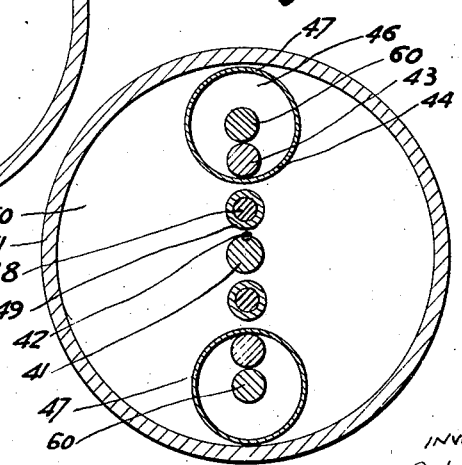
INVENTOR:
F. M. M. B. Salomon
By: Glascock Downing & Seebold
Attys Patented Feb. 4, 1936

2,029,796

UNITED STATES PATENT OFFICE 2,029,796

VIBRATION DAMPENER

François Marie Michel Bernard Salomon, Paris, France

Application November 21, 1934, Serial No. 754,120
In France November 29, 1933

7 Claims. (Cl. 74—574)

My invention has for its object the elimination or reduction of the oscillations in speed, vibrations and jerks which often occur in rotary shafts under the action of various irregularities in the driving torque. For instance, driving torques in explosion or internal combustion motors are very irregular, especially in the case of motors having a small number of cylinders.

When it is desired to obtain in spite of such irregularities, a good constancy of speed, a flywheel is generally carried by the rotary shaft of the machine; but these fly wheels are generally heavy and cumbersome.

My invention has chiefly for its object the replacement of such fly wheels by much lighter fly wheels carrying movable masses, under conditions similar to those disclosed in my copending specification Ser. No. 663,866 but with modifications which render their action much more efficient and economical.

The same arrangement may be applied with great advantage for reducing the torsional oscillations which may be often noticed for certain speeds on shafts of many machines and also for compensating the jerks to which many machines are submitted.

My invention is applicable to various industrial purposes both for stationary machines or apparatuses and for aerial, marine or terrestrial motor vehicles.

According to my invention, the rocking masses adapted to make up for the disturbing torques exerted on the shaft which is to be protected against speed oscillations, vibrations or jerks, are solid masses adapted to rock with a rolling motion on races which are arranged inside the cooperating rolling surfaces carried by the rolling masses, the rocking motion of the latter being as in my prior specification caused on one hand by the disturbing torques and on the other hand by the centrifugal forces evolved through the rotation of the shaft.

Moreover the races for these masses are preferably constituted by cylindrical pins or studs rotating integrally with the shaft to be protected which will be termed hereinafter "the mainshaft". I prefer mounting these pins or studs in the side wall of a fly wheel keyed to the mainshaft.

In accompanying drawing given by way of example:

Fig. 1 is a cross section of a fly wheel executed according to one very simple form of execution of my invention, wherein the rocking masses are solids of revolution;

Fig. 2 is a part sectional front view of the same fly wheel,

Fig. 3 shows a fly wheel with rocking masses which are not of revolution cooperating with stops adapted to limit the extreme movements of the masses, Fig. 4 illustrates modified means for limiting such extreme movements.

In Fig. 1, the mainshaft 1 is made integral through the key 3 with a fly wheel 2 having a rim 7 connected with the hub in the usual manner.

Against the rim 7 is applied a flat guiding plate 8 secured to the rim by the screws 9 and the outer face of which is perpendicular to the axis of the flywheel. Through this plate 8 pass a certain number of regularly distributed bolts 10, the number of which may be two, three or more.

The fly wheel shown in Figs. 1 and 2 carries three such bolts 10 distributed at 120° from one another.

The outer part of the bolts 10 forms a cylinder 16, preferably of tempered cemented steel or of chromium nickel steel. These cylinders 16 form the races for the rolling masses.

Round each cylinder 16 a mass of revolution 11, preferably of cast iron or semi-hard steel may rock while rolling on the said cylinder.

This mass, the axis of which is shown at M has a hub 13, an annular recess 11' coaxial with and surrounding the hub, a front wall 17 forming the bottom of said recess and a rim 12 (Figs. 1 and 2).

The inner surface of the rim 12 forming the outer wall of the recess 11 bears, when the shaft 1 rotates against the portion of the cylinder 16 nearest the mainshaft under the action of the centrifugal forces evolved through rotation of the shaft 1.

If a periodical disturbing force of frequency $f$ is applied to the shaft 1 the mass 11 simultaneously rocks round and rolls over the cylinder 16 between positions 23 and 24 on either side of the point 1 with the same frequency $f$, the centrifugal forces exerting a return action on the rocking mass.

During this movement effected with very slight friction, the variations of the vis viva due to the rocking motion of the mass make up for the varying disturbing torque.

I have proved through calculation and through experiments that this compensation between the varying vis viva and disturbing torque may be made perfect whereby the angular speed of the fly-wheel 2 may be made constant, even if the fly-wheel has a very small momentum of inertia.

Moreover accurate calculation and numerous experiments have proved that the efficiency of the movable masses is the highest when the design of the fly-wheel and cooperating parts is such that the following condition is substantially satisfied (1) $$R_1 = \left(\frac{W}{u'_0}\right)^2 (r - R_2)\left(1 + \frac{K^2}{r^2}\right)$$

In this formula $R_1 = \overline{OK_1}$ (Fig. 2), O being a point on the axis of the main shaft, $K_1$ a point on the axis of a cylinder such as 16 forming a race in the same transversal plane as O, $R_2$ the radius of the race cylinder 16, $r$ the radius of the rolling surface of the rocking mass 11, $W$ the pulsation of the disturbing torque, $u'_0$ the mean angular speed of the shaft 1, $K$ the radius of gyration of the mass 11 with reference to its axis. This means that if $I_1$ is the momentum of inertia of this mass with reference to its axis and $m$ the value of the mass, $I_1 = mK_2$. It should be noted the ratio $$\left(\frac{W}{u'_0}\right)$$

is equal to the number $n$ of disturbances per revolution of the mainshaft.

In practice the value given to $R_1 = \overline{OK_1}$ should be slightly above, say by 2% to 4% that given out by the above formula 1 so as to take into account the frictional stresses, however small, and the elongation of the rocking motion of the masses.

The rolling masses are guided along their surface 14 nearest their axis by their hub 13 which is separated in operation from the cylinder 16 by a slight clearance 15. The masses are guided moreover at their periphery by the rim 7 of the fly-wheel and laterally by the cover 19. This cover which covers the recessed part of the fly-wheel in which the movable masses move is secured through screws 20 screwed into parts 21 integral with the fly-wheel.

In exceptional cases and for instance when the shaft slows down considerably, the elongation of the movements of the rolling masses becomes extreme. To prevent this, stops are provided which are constituted by yielding, sound-damping washers 22 preferably mounted on the same parts 21, which carry the screws 20.

The operation of the movable masses of the fly-wheel shown in Figs. 3 and 4 is similar to that disclosed hereinabove.

In Fig. 3, a fly-wheel 34 secured through the key 32 to the shaft 31 is provided with a lateral wall 33 connecting the hub with the rim. To this wall are secured the cylindrical pins 39 forming the races for the rolling masses and the number of which on Fig. 3 is supposed by way of example to be two.

The rolling masses 38 are adapted to rock over these pins 39 while rolling with reference thereto, without any lubrication and with very slight friction. These masses are provided with a slot 40 adapted to pass over the corresponding pin and carry eccentric parts such as 37; the ends of the slots are provided with substantially yielding sound damping stops 36.

The wall 35 of the slot is brought to bear against the inner side of the pin 39 by the centrifugal forces evolved by the rotation of the shaft 31. The stops 36 act only in case of extreme elongations of the rocking motion. In Fig. 4 the fly-wheel 50 having a rim 51 is secured to the shaft 41 of a machine by means of a key 42. To its side wall are secured pins such as 43 which serve as rolling races. Two such pins have been shown in Fig. 4 but obviously any number could be used. Over these pins masses such as 44 are adapted to oscillate while rolling in the same manner as in the case of Figs. 1 and 2. This mass 4' is constituted by a hub 60 and a rim 47 connected by a side wall 46.

The extreme elongations in oscillation are arrested by stops arranged along the radial lines connecting the axis of the mainshaft with the axes of the race pins in proximity to said mainshaft. This stop is preferably constituted by an inner cylindrical part 48 and a yielding sound-damping sleeve 49.

The forms of execution shown in the different accompanying figures are applicable for use not only against periodical disturbing torques producing irregularities in speed, but also against jerks and torsional oscillations in rotary shafts.

When a number of disturbing torques are acting on a mainshaft simultaneously, each of them should be eliminated or reduced by a corresponding set of rocking masses.

What I claim is:

1. An arrangement for protecting rotary shafts against speed oscillations, vibrations and jerks due to disturbing forces comprising a fly wheel, means for securing said fly wheel to said shaft, a plurality of rigid parts rigidly carried by the fly wheel and provided with convex guiding surfaces, a plurality of rigid masses independent from one another and from the shaft and provided with a contact surface adapted to bear against the guiding surface of a corresponding rigid part, said masses being adapted to rock with very slight friction over the guiding surface of the corresponding rigid part under the opposite action of the disturbing forces and of the centrifugal forces applying the contact surfaces of the masses against the guiding surfaces of the rigid parts.

2. An arrangement for protecting rotary shafts against speed oscillations, vibrations and jerks due to disturbing forces comprising a fly wheel, means for securing said fly wheel to said shaft, a plurality of rigid parts rigidly carried by the fly wheel and provided with convex guiding surfaces, a plurality of rigid masses independent from one another and from the shaft and provided with a contact surface adapted to bear against the guiding surface of a corresponding rigid part, said masses being adapted to rock with a rolling motion and very slight friction over the guiding surface of the corresponding rigid part under the opposite action of the disturbing forces and of the centrifugal forces applying the contact surfaces of the masses against the guiding surfaces of the rigid parts.

3. An arrangement for protecting rotary shafts against speed oscillations, vibrations and jerks due to disturbing forces comprising a fly wheel, means for securing said fly wheel to said shaft, a plurality of rigid parts rigidly carried by the fly wheel and provided with cylindrical convex guiding surfaces, a plurality of rigid masses independent from one another and from the shaft and provided with a contact surface adapted to bear against the guiding surface of a corresponding rigid part, said masses being adapted to rock with very slight friction over the cylindrical guiding surface of the corresponding rigid part under the opposite action of the disturbing forces and of the centrifugal forces applying the contact surfaces of the masses against the guiding surfaces of the rigid parts.

4. An arrangement for protecting rotary shafts against speed oscillations, vibrations and jerks due to disturbing forces comprising a fly wheel, means for securing said fly wheel to said shaft, a plurality of rigid parts rigidly carried by the fly wheel and provided with cylindrical convex guiding surfaces, a plurality of rigid masses of revolution independent from one another and from the shaft and provided with an annular contact surface integral therewith and adapted to bear against the guiding surface of a corresponding rigid part, said masses being adapted to rock with very slight friction over the cylindrical guiding surface of the corresponding rigid part under the opposite action of the disturbing forces and of the centrifugal forces applying the contact surfaces of the masses against the guiding surfaces of the rigid parts.

5. An arrangement for protecting rotary shafts against speed oscillations, vibrations and jerks due to disturbing forces acting $n$ times per revolution of the shaft comprising a fly wheel, means for securing said fly wheel to said shaft, a plurality of rigid parts rigidly carried by the fly wheel and provided with cylindrical convex guiding surfaces, a plurality of rigid masses of revolution independent from one another and from the shaft and provided with an annular contact surface integral therewith and adapted to bear against the guiding surface of a corresponding rigid part, said masses being adapted to rock in a plane perpendicular to the axis of the shaft with very slight friction over the cylindrical guiding surface of the corresponding rigid part under the opposite action of the disturbing forces and of the centrifugal forces applying the contact surfaces of the masses against the guiding surfaces of the rigid parts at a frequency substantially equal to $n$.

6. An arrangement for protecting rotary shafts against speed oscillations, vibrations and jerks due to disturbing forces comprising a fly wheel, means for securing said fly wheel to said shaft, a plurality of rigid parts rigidly carried by the fly wheel and provided with convex guiding surfaces, a plurality of rigid masses independent from one another and from the shaft and provided with two contact surfaces of which one is adapted to bear against the guiding surface of a corresponding rigid part and the other cooperates with the said guiding surface for guiding the rigid mass in its allowed movements, said masses being adapted to rock in a plane perpendicular to the axis of the shaft with very slight friction over the guiding surface of the corresponding rigid part under the opposite action of the disturbing forces and of the centrifugal forces applying the first mentioned contact surfaces of the masses against the guiding surfaces of the rigid parts.

7. In an arrangement as claimed in claim 1 the provision of yielding sound damping stops carried by the fly wheel and adapted to arrest extreme elongations of the rocking masses with reference to the rigid parts on the fly wheel against which they bear.

FRANÇOIS MARIE MICHEL
BERNARD SALOMON.